H. DILLON.
BUMPER.
APPLICATION FILED MAY 1, 1912.
1,053,016.
Patented Feb. 11, 1913.
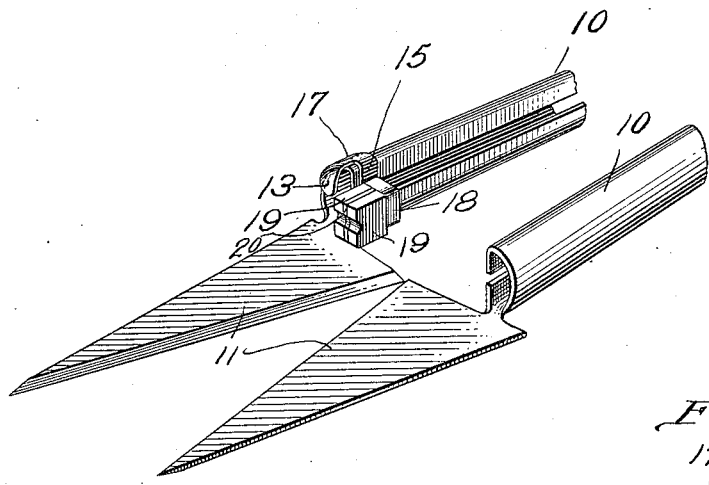
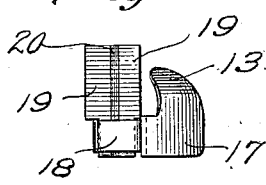
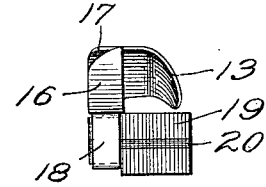
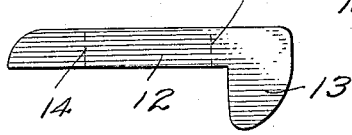
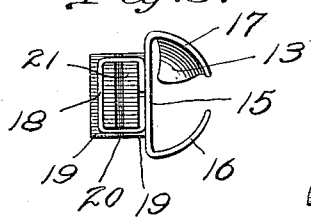
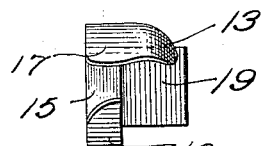
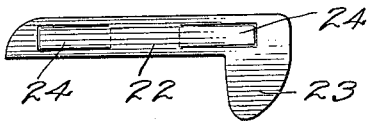
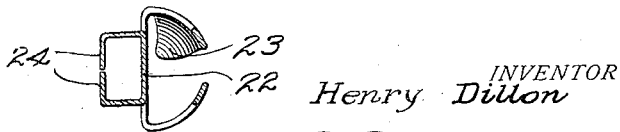
WITNESSES
INVENTOR
Henry Dillon
By E. E. Vrooman,
Attorney

UNITED STATES PATENT OFFICE.

HENRY DILLON, OF NORTH YAKIMA, WASHINGTON.

BUMPER.

1,053,016.  Specification of Letters Patent.  Patented Feb. 11, 1913.

Application filed May 1, 1912. Serial No. 694,346.

*To all whom it may concern:*

Be it known that I, HENRY DILLON, a citizen of the United States, residing at North Yakima, in the county of Yakima and State of Washington, have invented certain new and useful Improvements in Bumpers, of which the following is a specification, reference being had therein to the accompanying drawing.

This invention relates to an attachment which is used in connection with a pair of shears of the type which are used in shearing off wool of sheep.

The principal object of the invention is to provide a bumper which is connected with the handle of the sheep shears so that the extent to which the handle may be brought together may be limited.

This invention comprises a metallic frame which is connected with the handle of the shears and carries a pad which extends toward the second handle and against which the handle abuts so as to prevent the handle from being brought entirely together.

This invention is illustrated in the accompanying drawings, wherein:

Figure 1 is a perspective view of a pair of sheep shears with the bumper applied, the handles of the shears being broken off. Fig. 2 is a top plan view of the bumper. Fig. 3 is an end view looking at the inner end of the bumper. Fig. 4 is an end view looking at the outer end of the bumper. Fig. 5 is a side elevation of the bumper. Fig. 6 is a plan view of the blank from which the frame of the bumper is formed. Fig. 7 is a plan view of a modified form of blank. Fig. 8 is a sectional view taken through the frame formed from the blank shown in Fig. 7.

Referring to the accompanying drawings, it will be seen that this invention is intended to be mounted upon one of the handles 10 of a pair of sheep shears adjacent the cutting blade 11, and comprises a frame which carries the pad against which the second handle abuts. This frame may be formed from the blank shown in Fig. 6 or from that shown in Fig. 7, the frame shown in Fig. 6 comprising the oblong body portion 12 from one end of which there extends the tongue 13. This blank is bent along the dotted lines 14 to form the central portion 15, and end portions 16 and 17. These end portions extend around the handle 10, and the tongue 13 is bent over the end of the handle so as to prevent rearward movement of the bumper.

A second strip of metal is bent to form a rectangular housing 18 which is soldered or otherwise secured to the central portion 15, and extends between the handles 10 so that the pad may be mounted between the handles. The pad comprises the outer sections 19 which are preferably formed of leather, and the intermediate section 20 which is preferably formed from rubber so that resiliency will be given to the bumper. The inner end portions of the sections 19 are reduced to form the neck 21 which passes through the housing 18.

In Figs. 7 and 8, I have shown a modified form of frame, which is formed from the blank shown in Fig. 7, the blank comprising a body portion 22 from one end of which extends the tongue 23. Strips 24 are struck from the body portion and are bent to form the housing in which the pad is mounted, and the body portion is bent adjacent the end in an opposite direction to form the frame through which the handle of the shears passes. This frame is very similar to the frame shown in Fig. 3, with the exception of the fact that the pad housing is formed by cutting strips from the body portion, and bending them to form the housing instead of forming a housing from a separate strip of metal and securing it to the body portion. This frame is easily mounted upon the shears and may be very readily removed and placed upon a new pair of shears when desired and the pad may be renewed when worn out by simply withdrawing it from the housing, and inserting a new one in its place. It must be seen that a device has been provided which may be used a number of times, and the pad of which may be renewed when it is worn out without it being necessary to remove the frame from the shears.

What is claimed is:—

1. An attachment of the character described comprising a frame formed from a strip of material bent to form a central portion having arms extending therefrom, a tongue extending from one of said arms, a housing carried by said frame, and a pad mounted in said housing.

2. In a bumper, a frame comprising a body portion, strips struck from said body portion, and bent to form a housing, the end portions of said body portion being bent to form engaging arms, a tongue extending from one of said arms, and a pad comprising a plurality of sections, the central section being resilient, said pad having one end portion reduced to form a neck passing through said housing.

3. In a bumper, an attaching frame, a housing carried by said frame, a pad carried by said housing, said pad being formed from a plurality of layers one of said layers being resilient.

4. A combination of a pair of shears provided with cutting blades, and handles leading from said cutting blades, a bumper mounted upon one of said handles and comprising a frame fitting about said handles, a tongue extending from said frame over the forward end of said handle to limit the longitudinal movement of said frame, a housing carried by said frame and extending between said handles, and a pad carried by said housing.

5. A bumper comprising an attaching frame, a housing extending from said frame, a pad carried by said housing, said pad being formed from a plurality of sections the inner section being resilient and the outer section unresilient.

In testimony whereof I hereunto affix my signature in presence of two witnesses.

HENRY DILLON.

Witnesses:
 M. WALLACE,
 C. E. DOUST.

---

Copies of this patent may be obtained for five cents each, by addressing the "Commissioner of Patents, Washington, D. C."